J. W. AYLSWORTH.
PHONOGRAPH RECORD.
APPLICATION FILED APR. 4, 1907.
1,036,415.
Patented Aug. 20, 1912.
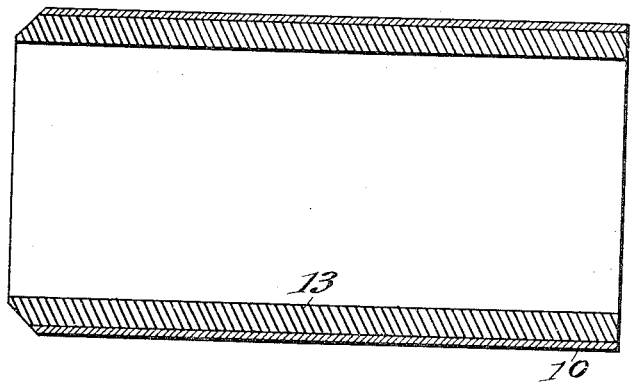
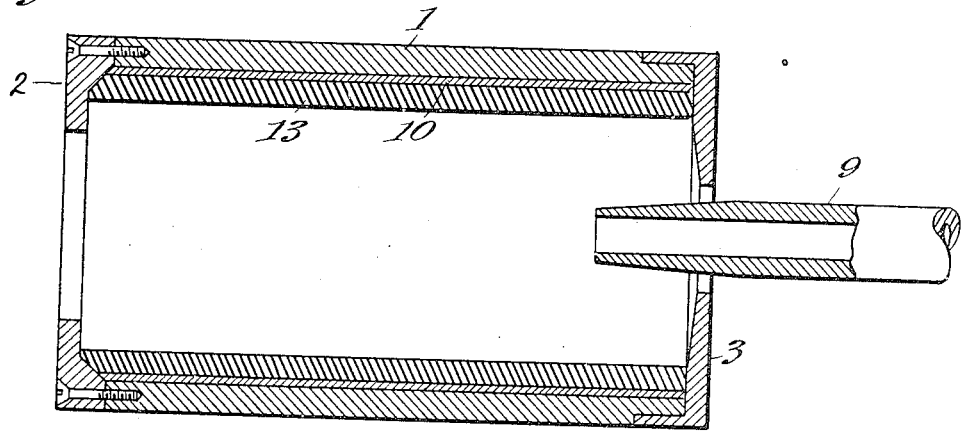

UNITED STATES PATENT OFFICE.

JONAS W. AYLSWORTH, OF EAST ORANGE, NEW JERSEY, ASSIGNOR, BY MESNE ASSIGNMENTS, TO THOMAS A. EDISON, INCORPORATED, OF WEST ORANGE, NEW JERSEY, A CORPORATION OF NEW JERSEY.

PHONOGRAPH-RECORD.

1,036,415. Specification of Letters Patent. Patented Aug. 20, 1912.

Original application filed May 31, 1906, Serial No. 319,422. Divided and this application filed April 4, 1907. Serial No. 366,247.

*To all whom it may concern:*

Be it known that I, JONAS W. AYLSWORTH, a citizen of the United States, residing in East Orange, county of Essex, and State of New Jersey, have invented certain new and useful Improvements in Phonograph-Records, of which the following is a description.

This application is a division of Patent No. 855,606 granted June 4, 1907.

My invention relates to improved duplicate phonograph records, which can be manufactured very cheaply and which will be of superior character.

I have also devised an improved process and apparatus designed especially for producing the improved records, although they may be employed for the manufacture of records of other types. The process referred to forms the subject matter of the patent of which this is a division.

The improved record which constitutes the present invention is a composite cylindrical structure having an outer layer of a tough, smooth, amorphous material, in which the record surface is formed and from which a smooth and brilliant reproduction can be obtained, and a main body or support therefor composed of a very cheap and tough material unsuitable itself for receiving a record surface, the two layers being welded together so as to constitute practically a single homogeneous structure, as I will more fully hereinafter describe and claim.

The improved process is one in which the material in a molten state or in solid or powdered form is introduced into a rapidly rotating mold, as I describe in patents numbered 855,605, 855,553 and 855,554, all granted on June 4, 1907, the outer layer being first formed by the centrifugal force developed and, when the material thereof is sufficiently set but preferably while still slightly plastic, the material to constitute the inner or main layer is introduced so as to be intimately welded to the outer layer. The process also contemplates the carrying on of operations by which the interior of the record may be suitably developed to fit the supporting mandrels of talking machines of the phonograph type, although if an expanding mandrel is employed as disclosed in the Patent No. 855,604 granted June 4, 1907, of Aylsworth and Dyer, no separate finishing operation is necessary, since when the records are removed from the molds after being chilled therein, they will, as an inherent result of the process, be formed with perfectly smooth cylindrical bores.

The apparatus used in the above process is essentially of the type disclosed in my Patent No. 855,605, above referred to, except that I make use of supplementary mechanism for finishing the bores of the records, when this is desirable.

In order that the invention may be better understood, attention is directed to the accompanying drawings, forming part of this specification, in which—

Figure 1 is a longitudinal sectional view of the improved duplicate phonograph record, Fig. 2, a similar view of the rotating mold, showing the formation of the record thereon.

In both of the views corresponding parts are represented by the same numerals of reference.

The mold is of tubular form, carrying on its bore the representation in relief of the record to be duplicated and is produced in any suitable and convenient way, preferably by a process of vacuous deposit, as is well known in the art. This mold is provided with a stationary end flange 2, carrying the usual engraved matter for identifying the record, and with a removable end flange 3, adapted to be secured in place in any suitable way. While the record is being formed in the mold, the latter is rotated so as to cause the material to be uniformly distributed over the record surface by reason of the centrifugal force developed. This may be accomplished by any suitable mechanism such as that shown in Patent No. 855,606, above referred to.

In the process described in the patent above referred to, material may be introduced within the mold in various states, and the mold treated in various ways, as described in the said patent, the result being in each case to produce the product herein described and claimed. In whatever way or condition the material is introduced within the mold, as described in the said patent, the mold is rotated at the necessary speed to develop sufficient centrifugal force, and the material is distributed uniformly over the record surface, so as to form a relatively thin layer 10, which during the time of its distribution will be maintained in a fluid condition so as to displace any air or gas bubbles and result in a very perfect impression being taken. In the process of the patent above referred to resulting in the product herein described and claimed, this outer or surface layer of the record is caused to set or harden by means there described. When the material of the layer 10 has been thus set, and preferably, while still slightly plastic and sticky, the material for the inner layer or body 13 of the record is introduced, the mold being still rotated, whereby the material will distribute itself uniformly over and with respect to the surfacing layer 10, and be intimately welded and associated therewith, so as to form practically a continuous structure. The weld or joint thus formed is autogenous, the composite product formed by a union of this character being different from one in which an intermediate layer of cement material is employed, as in the latter case, the cement or solution employed penetrates within and permeates the composition to a certain extent. Unless the melting point of the surfacing layer 10 is considerably higher than the melting point of the material comprising the body 13, it will not be practicable to introduce the material for the latter layer in solid form, since it is important that after the surfacing layer has been properly distributed it should retain its solidified condition. Therefore, I introduce a material for the inner layer in the molten state and continue the rotation of the mold until the material has set sufficiently to retain its cylindrical form, as described in my Patent No. 855,606 above referred to. The record may be finished as described in this patent.

Many materials, suitable for the formation of at least the inner portion of duplicate sound records, are so viscid and sticky when molten or in a plastic condition that any attempt to cut them in that state in the finishing of the record would be impossible. A method is described in my Patent No. 855,606 above referred to, however, by which material is displaced by means of a rotatable mandrel, whereby the bores of records composed of extremely viscid materials can be effectively finished. Accordingly, it is possible to use as a material for the inner layer of my record a material which is sticky or viscid when molten and which cannot, therefore, be effectively cut.

As I have already indicated, the surfacing layer 10 of the record should be composed of a hard and extremely smooth material, so as to resist wear of the reproducer stylus, and eliminate scratching noises as much as possible. This surfacing layer may be made quite thin, so that a relatively expensive material for the same can be effectively used. An example of a suitable composition from which the surfacing layer may be formed is the special transparent composition described in my Patent No. 676,111 dated June 11th, 1910.

A suitable example of material from which the inner or body layer may be formed, and which while being extremely cheap is at the same time tough and of approximately the same coefficient of expansion as the material above referred to, is the following: asphalt 80 parts, stearin pitch 20 parts. In the make up of this composition the ingredients are melted and intimately mixed.

Having now described my invention, what I claim as new and desire to secure by Letters Patent is as follows:

1. An improved duplicate cylindrical sound record, comprising a surfacing layer of a very smooth amorphous material carrying the record impression, and an interior layer intimately welded thereto and formed of a mixture of asphalt and stearin pitch, substantially as set forth.

2. An improved duplicate cylindrical sound record, comprising a surfacing layer of a very smooth amorphous material carrying the record impression, and an interior layer intimately welded thereto and formed of a mixture or asphalt and stearin pitch in which the asphalt greatly predominates, substantially as set forth.

This specification signed and witnessed this 3rd day of April 1907.

JONAS W. AYLSWORTH.

Witnesses:
 FRANK D. LEWIS,
 ANNA R. KLEHM.

It is hereby certified that in Letters Patent No. 1,036,415, granted August 20, 1912, upon the application of Jonas W. Aylsworth, of East Orange, New Jersey, for an improvement in "Phonograph-Records," errors appear in the printed specification requiring correction as follows: Page 2, line 75, for the date, "June 11th, 1910" read *June 11th, 1901;* and same page, line 101, for the word "or" read *of;* and that the said Letters Patent should be read with these corrections therein that the same may conform to the record of the case in the Patent Office.

Signed and sealed this 17th day of September, A. D., 1912.

[SEAL.]

C. C. BILLINGS,
*Acting Commissioner of Patents.*